(12) United States Patent
Chiang

(10) Patent No.: US 10,118,362 B2
(45) Date of Patent: Nov. 6, 2018

(54) MULTILAYER COMPOSITE CLOTH WITH DIFFERENT ELASTICITIES AND SCALABILITIES AND APPLICATION THEREOF

(71) Applicant: Hai Chiang, Taichung (TW)

(72) Inventor: Hai Chiang, Taichung (TW)

( * ) Notice: Subject to any disclaimer, the term of this patent is extended or adjusted under 35 U.S.C. 154(b) by 755 days.

(21) Appl. No.: 14/248,704

(22) Filed: Apr. 9, 2014

(65) Prior Publication Data

US 2015/0290905 A1    Oct. 15, 2015

(51) Int. Cl.
*B32B 5/02* (2006.01)
*B32B 27/34* (2006.01)
*B32B 27/40* (2006.01)
*B32B 27/12* (2006.01)

(52) U.S. Cl.
CPC ............. *B32B 5/024* (2013.01); *B32B 27/12* (2013.01); *B32B 27/40* (2013.01); *B32B 2250/03* (2013.01); *B32B 2262/0261* (2013.01); *B32B 2262/062* (2013.01); *B32B 2274/00* (2013.01); *B32B 2307/51* (2013.01); *B32B 2307/75* (2013.01); *B32B 2437/00* (2013.01)

(58) Field of Classification Search
None
See application file for complete search history.

(56) References Cited

U.S. PATENT DOCUMENTS

2008/0065123 A1* 3/2008 Yli-Urpo ................ A61L 27/10
606/151

FOREIGN PATENT DOCUMENTS

JP    2011122282    *    6/2011

OTHER PUBLICATIONS

Machine translation of JP2011122282, Nitto et al., Jun. 2011.*

* cited by examiner

*Primary Examiner* — Shawn Mckinnon
(74) *Attorney, Agent, or Firm* — Egbert Law Offices, PLLC

(57) ABSTRACT

A multilayer composite cloth with different flexibility and scalability can be used in wearing articles. The multilayer composite cloth has at least two surface-overlaid stretch cloths to present a multilayer composite structure. An elastic enhancement strip is bound between the two stretch cloths and corresponds to local area of the two stretch cloths, enabling the distribution area of the elastic enhancement strip to generate different elasticity. The elastic enhancement strip is hidden between the stretch cloths but does not appear on the surface of the composite co-structure cloth, thus enabling the composite co-structure cloth to present one cloth pattern with different elasticity and scalability. This cloth used in wearing articles will provide binding, support or bracing to muscles or joints maintain aesthetics of wearing articles and achieve the goals of protection, reducing injury probability, slimming and beauty.

4 Claims, 7 Drawing Sheets

MULTILAYER COMPOSITE CLOTH WITH DIFFERENT ELASTICITIES AND SCALABILITIES AND APPLICATION THEREOF

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a multilayer composite cloth and more particularly to a cloth of an innovative structure with different elasticity and scalability able to provide binding, support or bracing to users' muscles or joints at different body positions when used in wearing articles.

2. Description of Related Art Including Information Disclosed Under 37 CFR 1.97 and 37 CFR 1.98

As technology advances, many clothes in pursuit of docility, ventilation and comfort (e.g. tights and leggings, etc) have been developed in the market to make the wearers feel docile and comfortable when wearing them. They mostly apply soft and stretch cloth as the basic material. As for the manufacturing process of well-known stretch cloths, artificial elastic fiber and other elastic yarns are woven into the stretch cloths so that the stretch cloths generate expected elasticity.

However, since the well-known stretch cloth is mostly made of a single artificial elastic fiber or nylon, so that single and uniform elasticity will generate when the same stretch cloth is stretched from any direction. However, since local areas will not generate different elasticity, thus the wearing articles made of the cloth will not enhance binding or support against local areas of the human body (e.g. muscle on the leg or joints, etc). Although current manufacturers integrate elastic enhancement strips in the preset area on outer surface of the stretch cloth to enable different areas of stretch cloth to generate different elasticity and scalability, when said stretch cloth is made into clothes, the elastic enhancement strip on the outer surface of clothes will affect the texture of cloth, break or even fall off due to external frictions and reduce the variability, utility and beauty greatly (since patterns and stripes will be hidden by the elastic enhancement strip).

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related articles.

BRIEF SUMMARY OF THE INVENTION

A multilayer cloth with different elasticity and scalability and articles made up of this cloth revealed by the present invention is a composite co-structure basic cloth structure with an elastic enhancement strip hidden between the stretch cloths. Thus, compared to former technologies, the appearance of composite co-structure cloth presents a common cloth but different elasticity and scalability, so that this cloth used in wearing articles will provide binding, support or bracing to muscles or joints against users' different body positions, maintains aesthetics of wearing articles and achieves the goals of protection, reducing injury probability, slimming and beauty.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
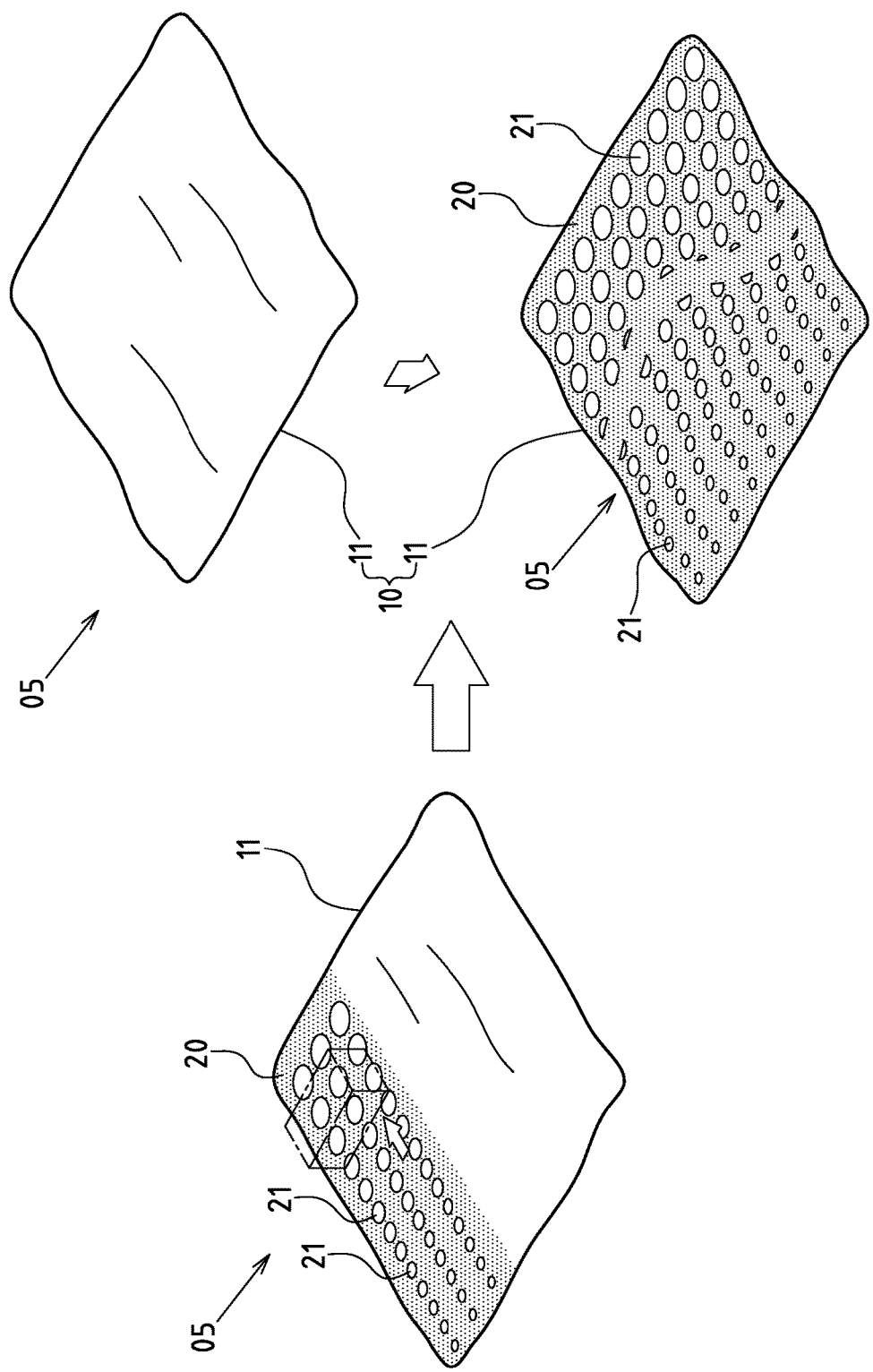
FIG. 1 is a schematic diagram of the composition type of the multilayer composite cloth.
Figure 2:
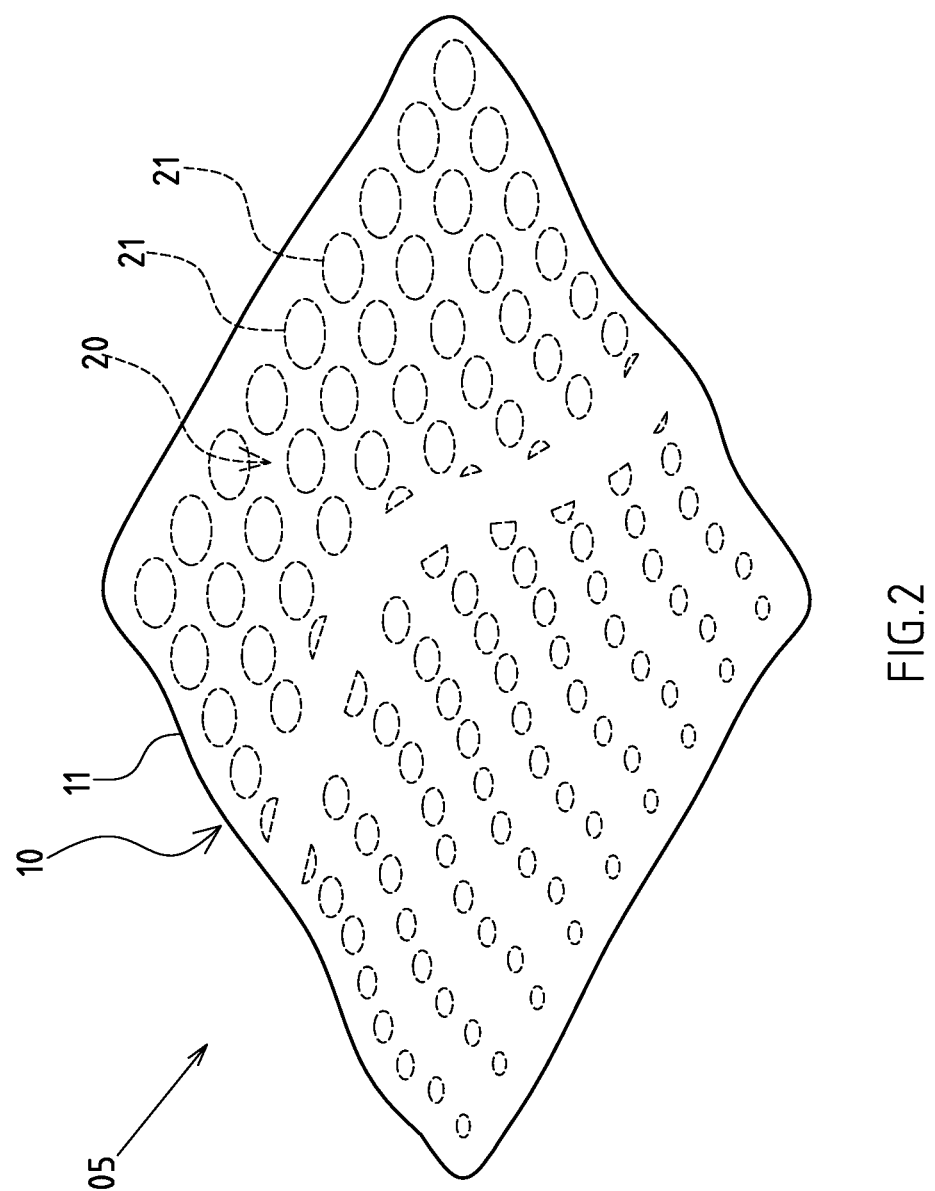
FIG. 2 is a stereogram of the multilayer composite cloth.
Figure 3:
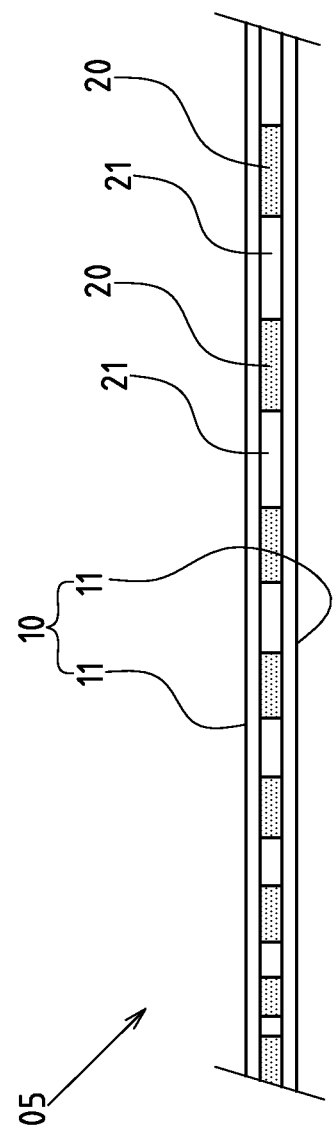
FIG. 3 is a section view of the multilayer composite cloth.

FIGS. 1-5 are the preferred embodiments of the present invention, i.e. multilayer cloth with different elasticity and scalability and articles made up of said cloth. However, those preferred embodiments are for descriptions only. Cloth used for patent application is not restricted by said structure. Said multilayer composite cloth 05 is composed of the following elements.

A composite co-structure basic cloth 10 is of a preset extension facet structure with flexibility, at least comprising two surface-overlaid stretch cloths 11 to make the basic cloth 10 present a multilayer composite structure. A stretch cloth 11 for composite co-structure basic cloth 10 is of a two-way or four-way elasticity structure woven through elastic yarn and artificial fiber (e.g. nylon) or natural fiber (e.g. cotton). The elastic yarn shall include but not limited to one of elastic fiber (Spandex or Elastane), lycra or rubber.

An elastic enhancement strip 20 is bound between the two stretch cloths 11 and corresponds to local area of the two stretch cloths. Said elastic enhancement strip 20 distributes in the form of preset pattern, lines or blocks or any of their combinations. A corresponding distribution area of the elastic enhancement strip 20 comprising of said stretch cloth 11 has different elasticity and scalability (see FIGS. 2 and 3 as well as FIGS. 4 and 5). Said elastic enhancement strip 20 is made from polymer elastic materials including but not limited to TPE (Thermo Plastic Elastomer), PU (Polyurethane) or silica gel, etc.

Said elastic enhancement strip 20 is hidden between the stretch cloths 11 but does not appear on the surface of the composite co-structure cloth 10, thus enabling the composite co-structure cloth 10 to present one cloth pattern (e.g. plain cloth).

Said elastic enhancement strip 20 can be used under the premise not to affect the composite co-structure cloth 10 to entrust different elasticity enhancement effects to different areas of composite co-structure cloth as required, and promote the appearance variability and applicability (e.g. patterns and words set on the surface of composite co-structure cloth 10) of the composite co-structure cloth 10. The elastic enhancement strip 20 will not affect the beauty or fall off due to friction.

Figure 6:
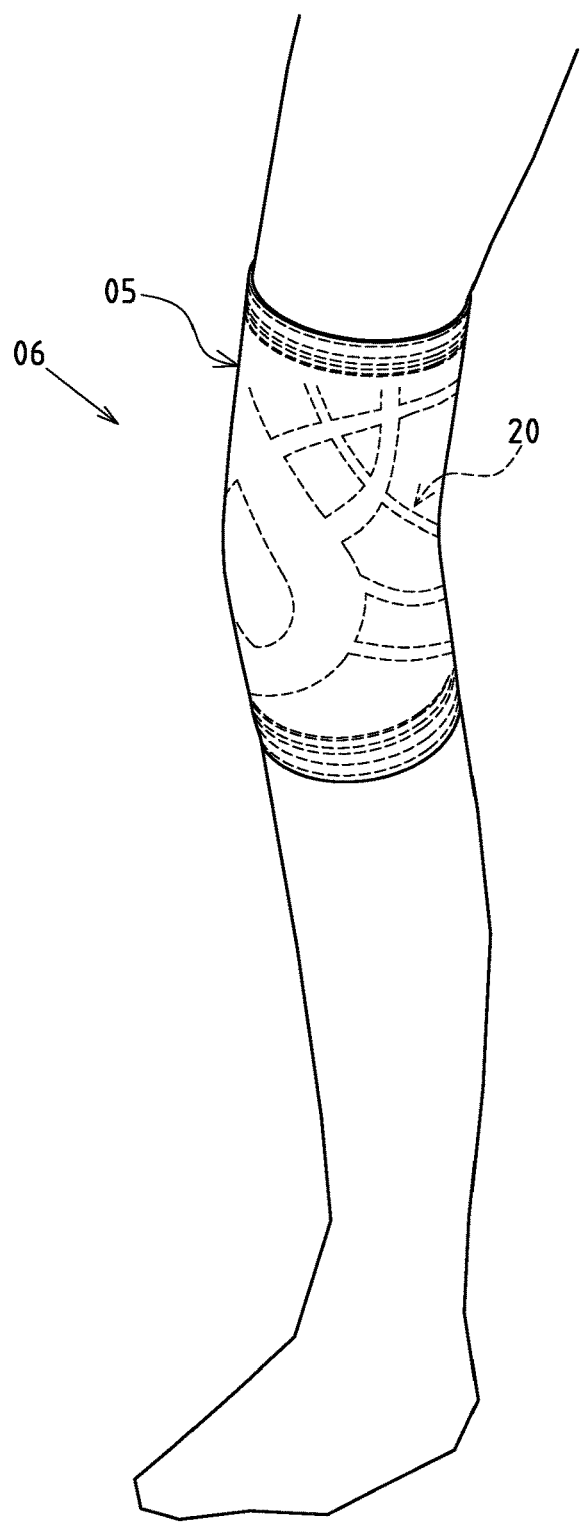
FIG. 6 is a plane graph of the present invention used in wearing articles.
Figure 7:
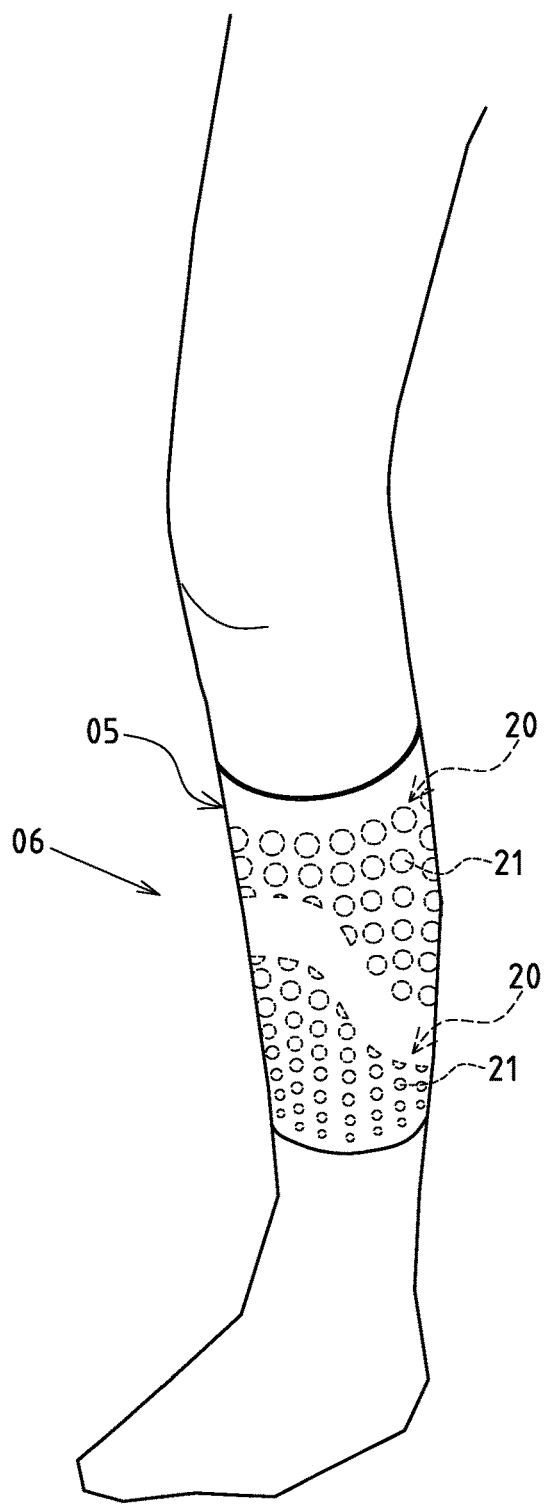
FIG. 7 is a plane graph of the present invention used in wearing articles.

In conclusion, the other core design of the present invention is said multilayer composite cloth 05 used in the wearing article 06. Wearing articles 06 include but are not limited to clothes next to the skin (e.g. bras and underwear, etc), slimming clothes, swimming clothes (e.g. swimming suit, trousers and swimming hats, etc), tights (sports tights and leggings, etc), dancing clothes, sports or rehabilitation protection apparatuses (wrist, kneecap, etc). Referring to FIG. 6, said wearing article 06 is a sports kneecap cover, where, the elastic enhancement strip 20 distributes in the preset area for sports kneecap, thus able to enhance the elasticity of this area, enable the sports kneecap with different elasticity and scalability. It provides binding and support as well as health care and rehabilitation according to requirements by users' special muscle and different joints mobility. Besides, seen from FIG. 2 and FIG. 7, said elastic enhancement strip 20 distributes in a facet type and many openings 21 form within the distribution area of the elastic enhancement strip 20. Said opening 21 with preset size and arrangement intervals enables the elastic enhancement strip 20 to generate different elasticity based on the sizes and arrangement intervals of the opening 21. Referring to FIG. 7, the opening 21 enlarges from bottom to top, so that the elasticity of the wearing article 06 decreases gradually from bottom to top (as the opening 21 enlarges, the area of opening 21 decreases and the elasticity reduces accordingly). This will apply appropriate binding forces on different positions of users' legs and promote the effect of blood inverse flow.

Figure 4:
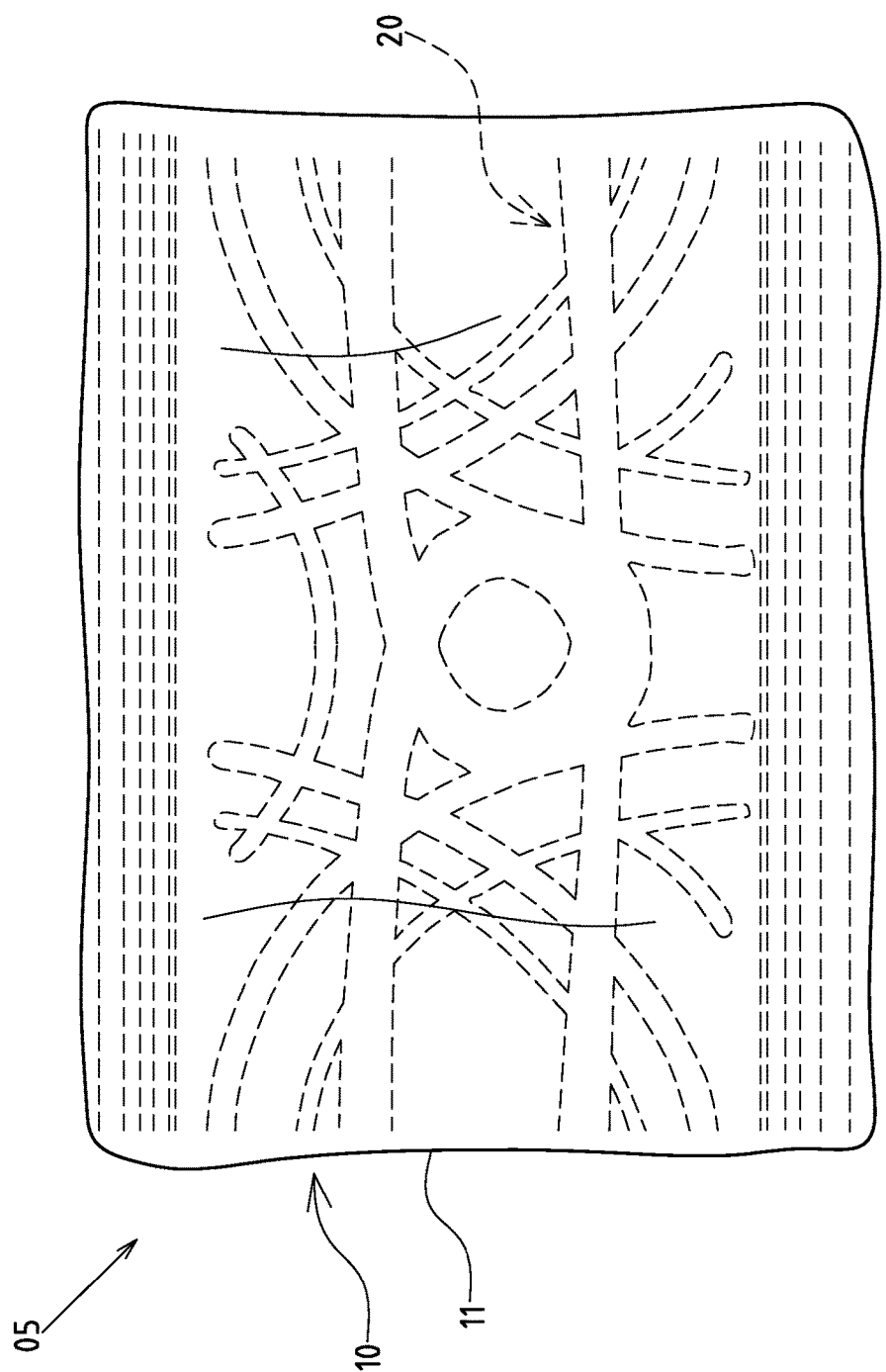
FIG. 4 is a plane graph of the other distribution form of the elastic enhancement strip.
Figure 5:
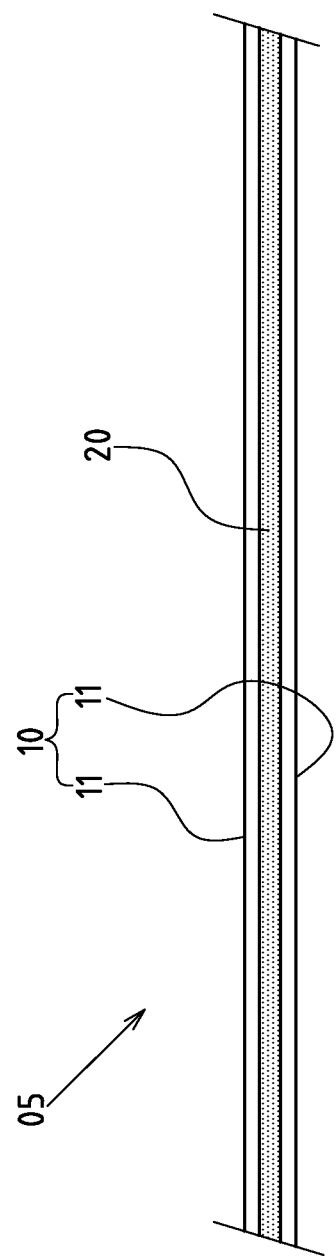
FIG. 5 is a section view of the multilayer composite cloth.

Referring to FIG. 4 and FIG. 6, the plurality of elastic enhancement strips 20 distribute force in a preset interval. The lines type constituted of a crisscross can also enhance the elasticity in local areas of wearing articles 06, so as to strengthen the binding of muscle groups and stabilize the joints. Or, when wearing article 06 is clothing next to the skin (e.g. bra, not indicated in the figure), the elastic enhancement strip distributes at the lower edge of the clothing next to skin for breast bracing and molding. The principles are the same when used in other article, which are not described one after another.

Said plurality of elastic enhacement strips 20 are bound between the stretch cloths 11 and the pattern, lines or blocks of the elastic enhancement strips can be painted or printed. In FIG. 1 the present invention is printed.

I claim:

1. A composite cloth having differing elasticity and scalability, the composite cloth comprising:
    a basic cloth having at least two surface-overlaid stretch cloths, said basic cloth being of a multilayer composite structure; and
    a plurality of elastic enhancement strips bound between and located at a local area of said at least two surface-overlaid stretch cloths, said plurality of elastic enhancement strips defining a plurality of distribution areas having different elasticity and scalability, said elastic enhancement strip being hidden between said at least two surface-overlaid stretch cloths and does not appear at a surface of said basic cloth, said plurality of elastic enhancement strips consisting of a silica gel, said plurality of elastic enhancement strips defining a plurality of openings in said plurality of distribution areas so as to provide the plurality of distribution areas with the different elasticities and the scalabilities based on size and arrangement intervals of said plurality of openings, said plurality of elastic enhancement strips being arranged in a cris-cross pattern.

2. The composite cloth of claim 1, said basic cloth having a two-way or four-way elastic woven structure, said woven structure selected from the group consisting of elastic yarn, artificial fiber, and natural fiber.

3. The composite cloth of claim 1, said plurality of elastic enhancement strips being painted or printed onto at least one of said at least two-surface-overlaid stretch cloths.

4. A wearing article having the composite cloth of claim 1.

* * * * *